(12) United States Patent
Takahashi

(10) Patent No.: US 6,584,112 B1
(45) Date of Patent: Jun. 24, 2003

(54) EXCHANGE GUARANTEED TO HAVE SAME TERMINAL IDENTIFIER INFORMATION AS THAT OF SUBSCRIBER TERMINAL EQUIPMENT

(75) Inventor: Nobuo Takahashi, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/317,371

(22) Filed: May 14, 1999

(30) Foreign Application Priority Data

Jul. 21, 1998 (JP) .......................................... 10-219878

(51) Int. Cl.[7] .......................... H04L 12/28; H04L 12/56
(52) U.S. Cl. ...................... 370/420; 370/419; 370/421; 370/469
(58) Field of Search ................................ 370/469, 467, 370/241, 248, 420, 524, 522, 384, 217, 376, 385, 419, 421, 422, 423; 340/825.52

(56) References Cited

U.S. PATENT DOCUMENTS

| | | | | |
|---|---|---|---|---|
| 4,821,265 A | * | 4/1989 | Albal et al. | 370/469 |
| 5,732,070 A | * | 3/1998 | Hiroki | 340/825.52 |
| 5,748,628 A | * | 5/1998 | Ericson et al. | 370/384 |
| 6,009,093 A | * | 12/1999 | Choe | 370/376 |

OTHER PUBLICATIONS

ITU–T Recommendation Q 921; Mar. 93; ISDN User–Network Interface–Data Link Layer Specification p24–33.
ITU–T Recommendation, Q 931; Mar. 93; "Digital Subscriber Signalling System No. 1 (DSS 1)– ISDN User Network Interface Layer 3 Specification for Basic Call Control" p 136–143.

* cited by examiner

Primary Examiner—Ken Vanderpaye
Assistant Examiner—Phirin Sam
(74) Attorney, Agent, or Firm—Katten Muchin Zavis Rosenman

(57) ABSTRACT

An exchange connects terminal equipment each having terminal identifier information. A layer 3 control unit of the exchange generates a pseudo layer 3 global reception call; and a layer 2 control unit of the exchange terminates the global reception call at the terminal equipment, extracts before link establishment the terminal identifier information of the terminal equipment from a logical link establishment request frame sent from the terminal equipment in response to the termination, and notifies the terminal identifier information to the layer 3 control unit. The layer 3 layer control unit holds the terminal identifier information notified for subsequent termination of calls to the terminal equipment. By this means, matched terminal identifier information is maintained between the exchange and subscriber terminal equipment.

6 Claims, 14 Drawing Sheets

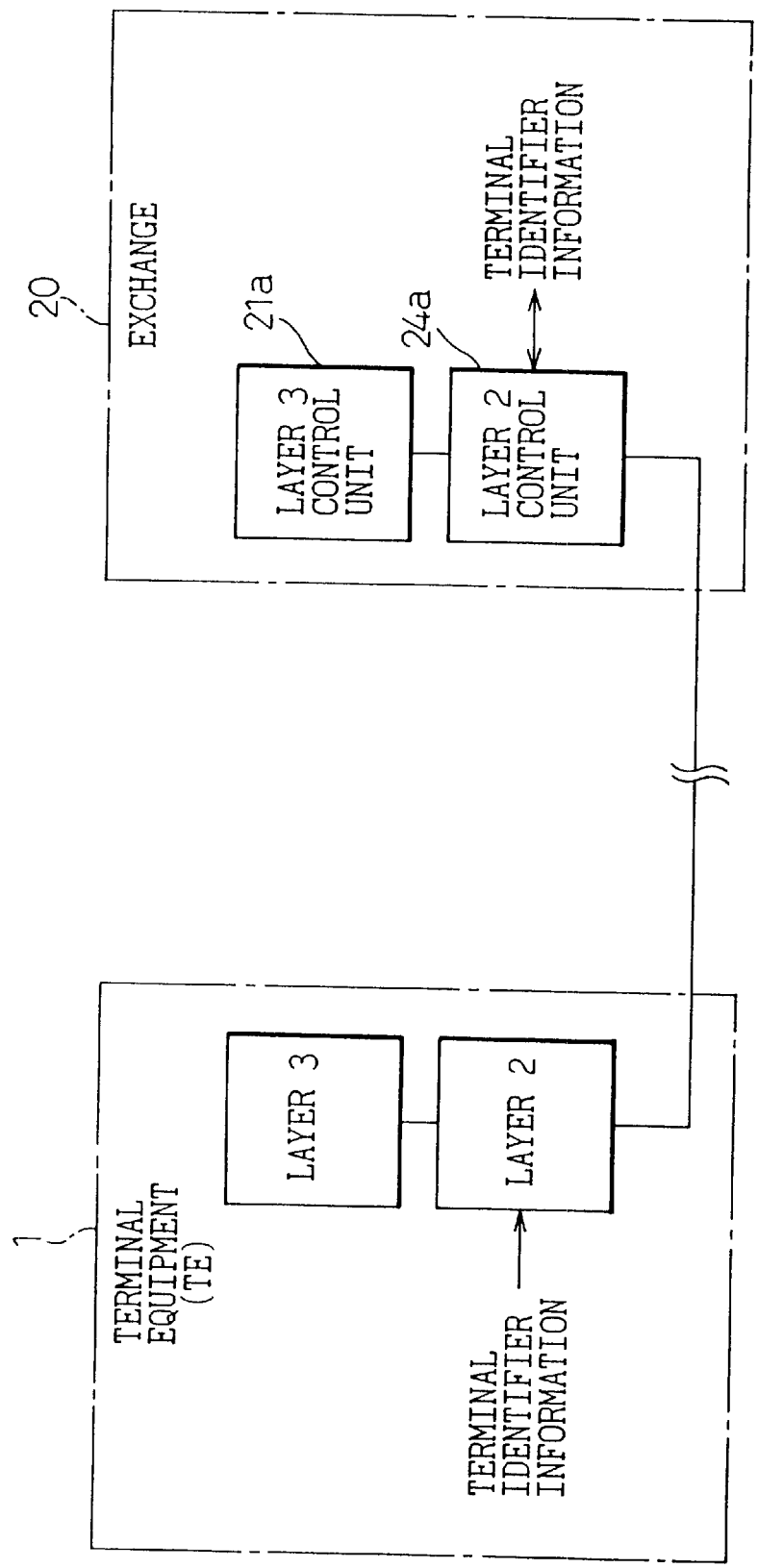

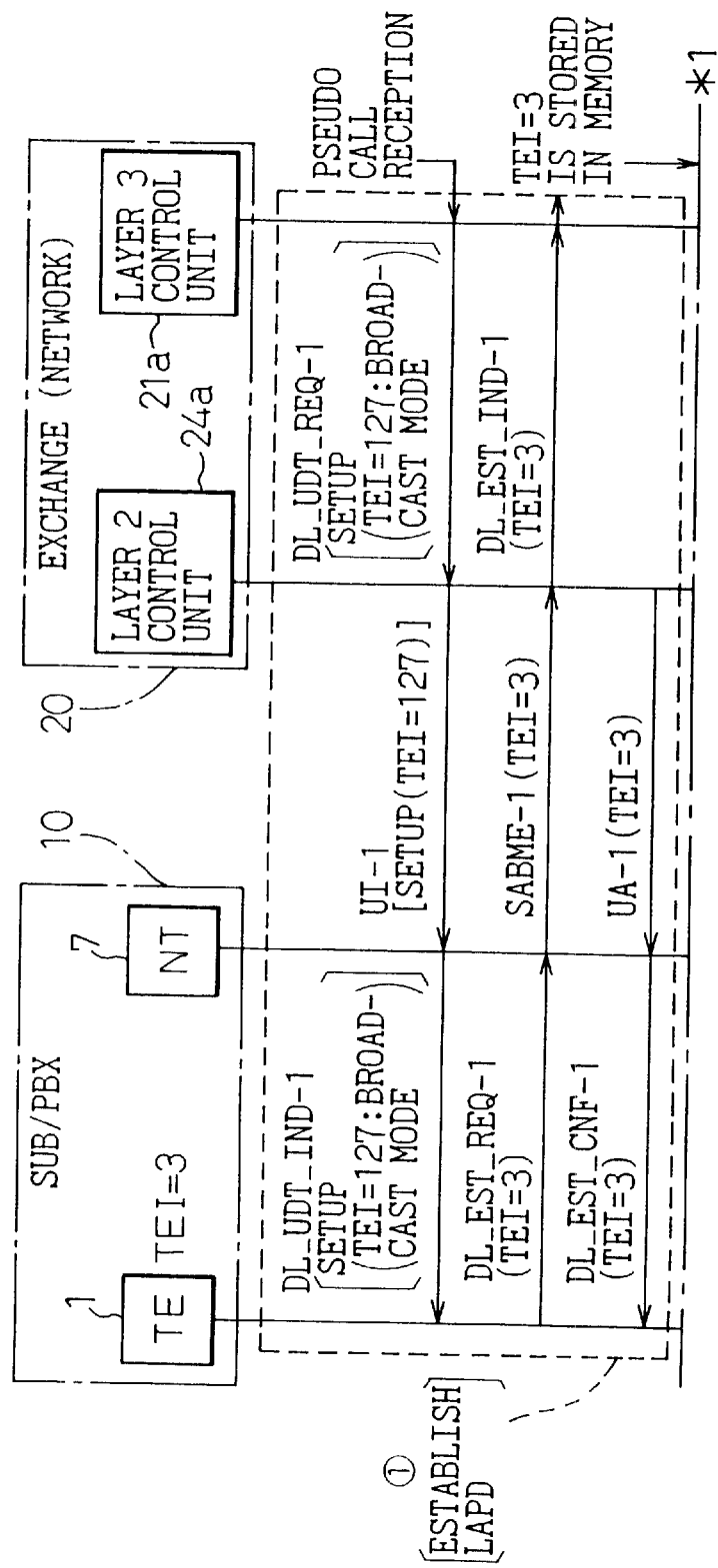

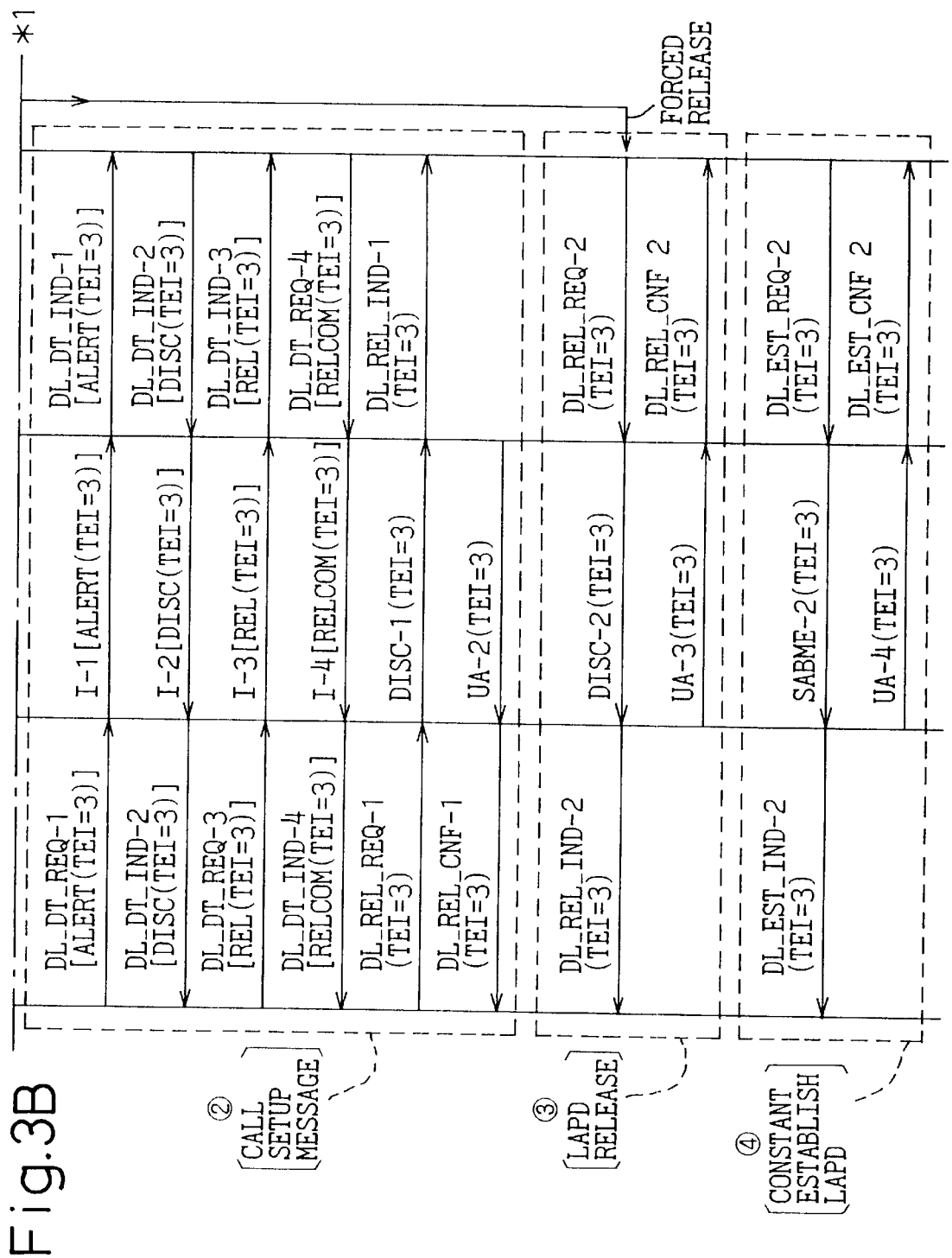

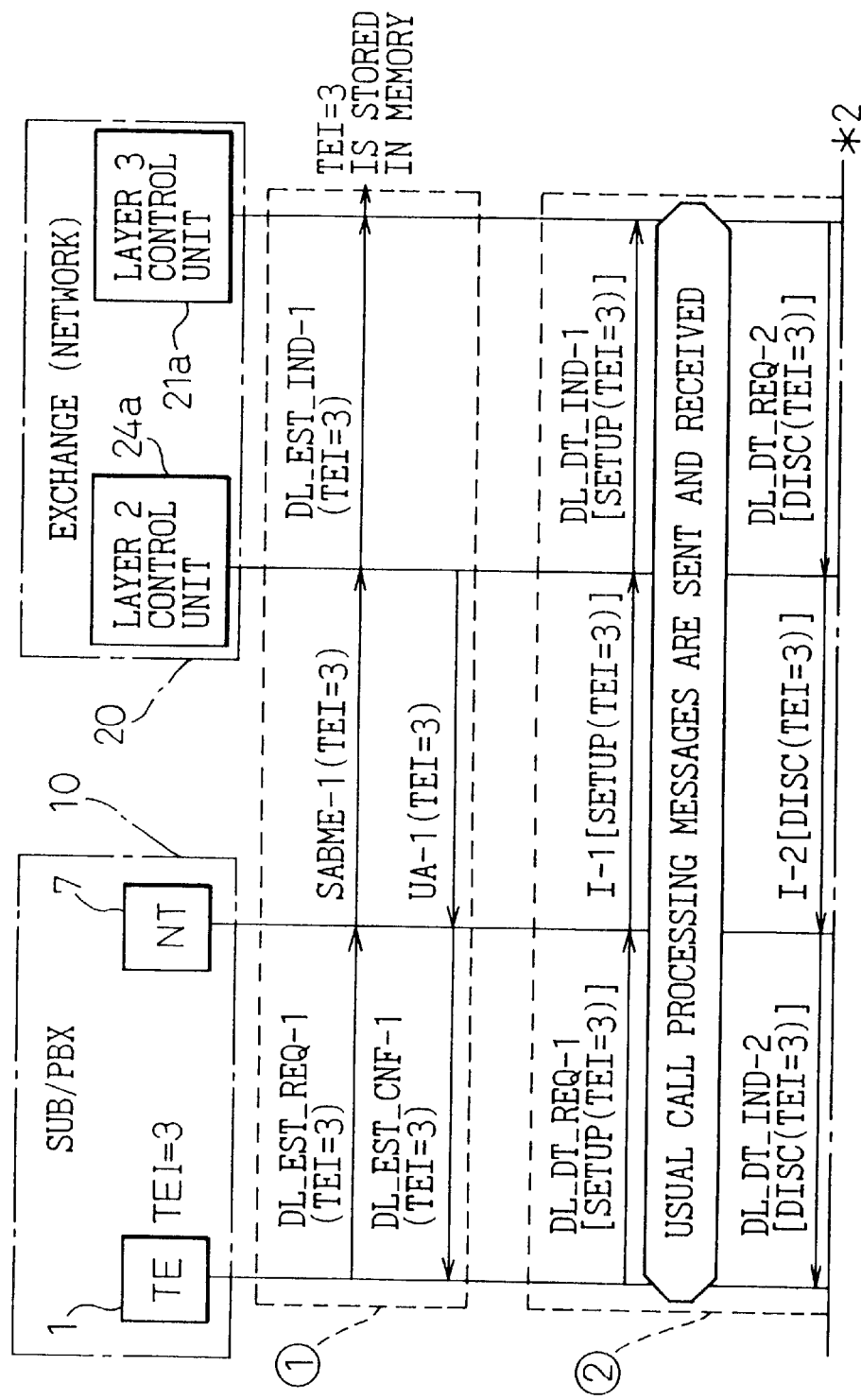

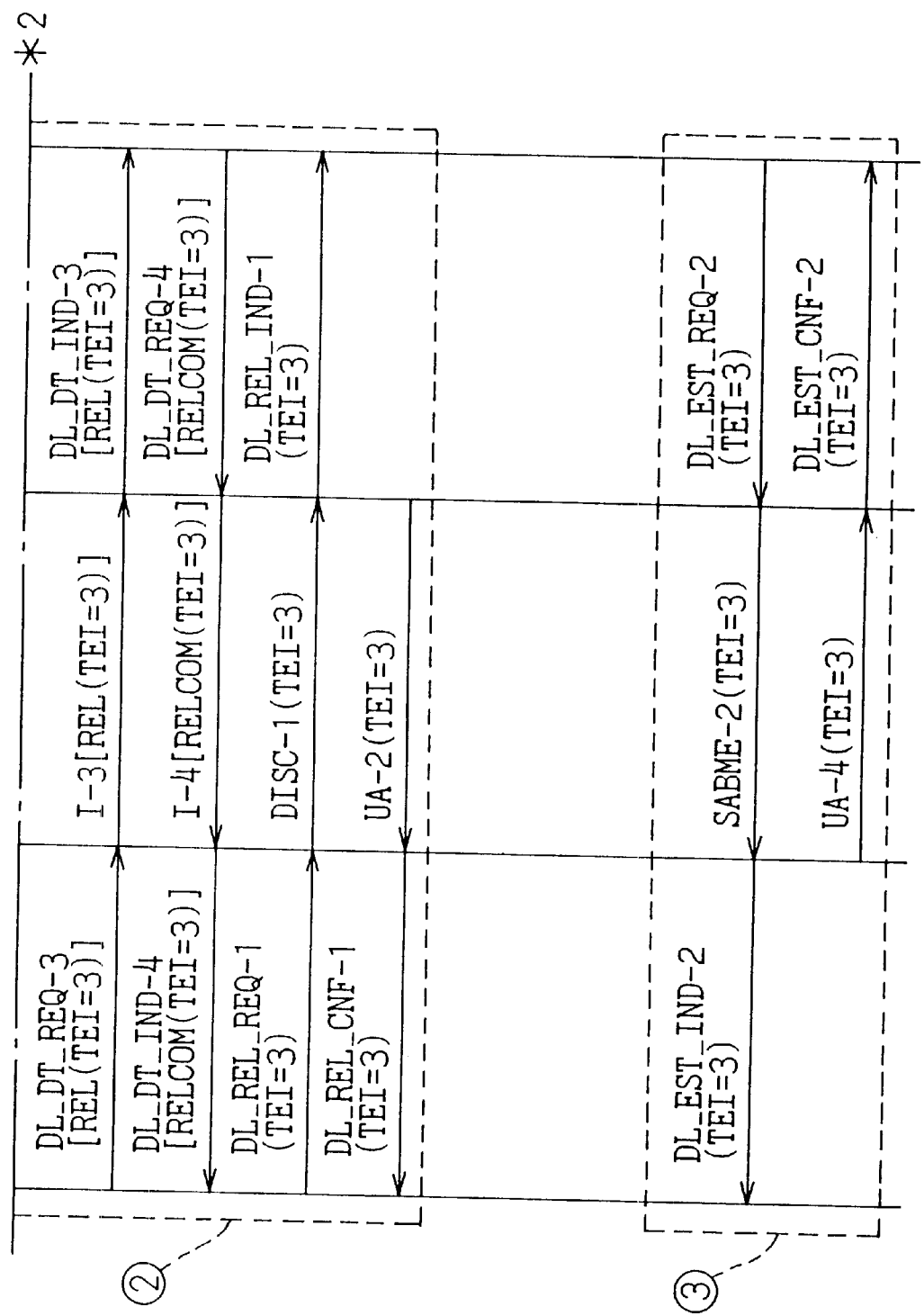

(POINT TO MULTI-POINT CONFIGURATION IN CASE OF BRI)

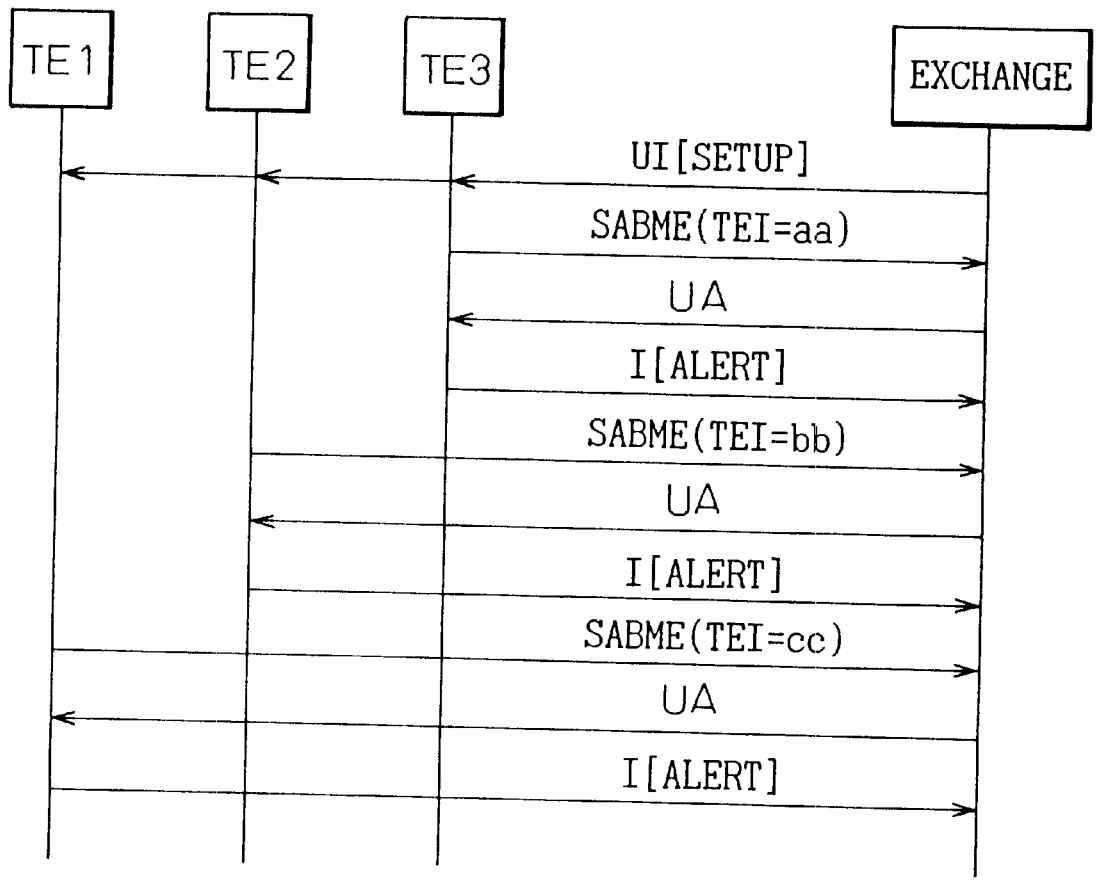

(POINT TO POINT CONFIGURATION)

(a) BRI  (b) PRI (RECEPTION PROCEDURE FOR POINT TO POINT CONFIGURATION)

Fig.7

LAPD FRAME

| CATEGORY | NAME OF FRAME | APPLICATION | C/R |
|---|---|---|---|
| INFORMATION TRANSFER | I (Information) | INFORMATION TRANSFER UNDER MULTIFRAME MODE | C |
| SUPERVISION | RR (Receive Ready) | INDICATION OF FRAME RECEPTION O.K. (NON-CONGESTION) | C,R |
| | RNR (Receive Not Ready) | INDICATION OF FRAME RECEPTION N.G. (CONGESTION) | C,R |
| | REJ (Reject) | PROMPT TO RETRANSMIT FRAME | C,R |
| UNNUMBERED SYSTEM | SABME (SABM Extended) | START SETTING OF MULTIFRAME LINK UNDER EXTENDED MODE | C |
| | DISC (Disconnect) | INDICATION OF MULTIFRAME LINK DISCONNECTION | C |
| | DM (Disconnect Mode) | NOTIFICATION OF MULTIFRAME LINK DISCONNECTION | R |
| | UA (Unnumbered Ack.) | ACKNOWLEDGE OF SABME/DISC | R |
| | FRMR (Frame Reject) | NOTIFICATION OF RECEIVED FRAME ERROR | R |
| | UI (Unnumbered Information) | INFORMATION TRANSFER UNDER UNNUMBERED INFORMATION TRANSFER MODE | C |
| CONTROL INFORMATION EXCHANGE | XID (Exchange ID) | PARAMETER NEGOTIATION | C,R |

Fig.8A

LAPD (DATA LINK) CONTROL

| PRIMITIVE (Q.921 RECOMMENDATION) | MEANING | FRAME ON LAPD |
|---|---|---|
| DL_ESTABLISH_REQUEST | REQUEST FOR MULTIFRAME LINK ESTABLISHMENT | SABME |
| DL_ESTABLISH_CONFIRM | NOTIFICATION OF COMPLETION OF MULTIFRAME LINK ESTABLISHMENT | |
| DL_RELEASE_REQUEST | REQUEST FOR MULTIFRAME LINK RELEASE | |
| DL_RELEASE_CONFIRM | NOTIFICATION OF COMPLETION OF MULTIFRAME LINK RELEASE | |
| DL_ESTABLISH_INDICATION | NOTIFICATION OF MULTIFRAME LINK ESTABLISHMENT | |
| DL_RELEASE_INDICATION | NOTIFICATION OF MULTIFRAME LINK RELEASE | |

Fig.8B

TRANSMISSION AND RECEPTION CONTROL OF LAYER 3 MESSAGE

| PRIMITIVE (Q.921 RECOMMENDATION) | MEANING | FRAME ON LAPD |
|---|---|---|
| DL_DATA_REQUEST | REQUEST FOR TRANSMITTING SERVICE DATA UNIT (SDU) WHEN MULTIFRAME LINK IS ESTABLISHED | I FRAME |
| DL_DATA_INDICATION | NOTIFICATION OF SDU RECEPTION WHEN MULTIFRAME LINK IS ESTABLISHED | |
| DL_UNIT_DATA_REQUEST | REQUEST FOR TRANSMITTING SDU WHEN MULTIFRAME LINK IS NOT ESTABLISHED | UI FRAME |
| DL_UNIT_DATA_INDICATION | NOTIFICATION OF SDU RECEPTION WHEN MULTIFRAME LINK IS NOT ESTABLISHED | |

Fig.9

PART OF LAYER 3 MESSAGES

| CATEGORY | NAME OF FRAME | MEANING |
|---|---|---|
| CALL SETUP MESSAGE | SETUP | CALL SETUP REQUEST |
| | CALL PROCeeding | NOTIFICATION OF CALL PROCEEDING |
| | ALERTing | NOTIFICATION OF RING UP FOR CALLED PARTY |
| CALL RELEASE MESSAGE | DISConnect | REQUEST FOR DISCONNECTION |
| | RELease | REQUEST FOR RELEASE |
| | RELease COMPlete | NOTIFICATION OF COMPLETION OF RELEASE |

EXCHANGE GUARANTEED TO HAVE SAME TERMINAL IDENTIFIER INFORMATION AS THAT OF SUBSCRIBER TERMINAL EQUIPMENT

BACKGROUND OF THE INVENTION

1. Field of the Invention

The present invention relates to an exchange, more particularly relates to an exchange of a communications system in which terminal equipment (TE) having its own terminal identifier information is connected to the exchange with a point to point configuration and a logical link is established conditional on a match, by a layer 2 procedure, of the terminal identifier information before link establishment and thereafter call processing, by a layer 3 message, is carried out.

The leading user-network interface of this type of communications system in Japan in the basic rate interface (BRI) of the integrated services digital network (ISDN). In this BRI, accommodation of a plurality of terminal equipment by logical link, portability of of terminal equipment, and so on are guaranteed. Depending on the mode of operation of the network, however, there are cases where the terminal endpoint identifiers (TEI) will not match between the exchange side and terminal equipment to be connected. If this unmatching occurs, the logical link will not be able to be established and users will not be able to communicate. Therefore, solution of this problem has been demanded.

2. Description of the Related Art

As will be explained in detail later by using the drawings, in such a point to point configuration BRI, at the time of reception, mistakes in input of subscriber data (TEI values) or mistakes in the setup of the subscriber data at the terminal equipment TE side sometimes results in the TEI value of the network side and the TEI value of the terminal equipment TE side not matching from the first.

Further, even if the TEI values of the two match at an initial stage, later changes in the terminal equipment TE etc. can cause the TEI value of the terminal equipment TE side to change. If this is not notified to maintenance personnel of the network side of if notified, but the TEI value of the network side is not properly changed, the values may not match.

Further, it is also possible to agree in advance to determine the TEI values of all subscribers as fixed values (for example, TEI=0) and use the fixed TEI values to establish, by the subscriber, the link access procedure on the D-channel (LAPD) call by call or at the input of the subscriber data. However, lack of thorough knowledge of the fixed TEI values or mistakes in the setup of the TEI values of the terminal equipment TE side etc. will cause the values not to match.

SUMMARY OF THE INVENTION

An object of the present invention is to provide, in view of the above problem, an exchange not allowing unmatching terminal identifier information between the exchange and subscriber terminal equipment having its own terminal identifier information.

To attain the above object, according to the present invention, there is provided an exchange of a communications system in which terminal equipment having its own terminal identifier information is connected to the exchange with a point to point configuration, a logical link is established conditional on a match, by a layer 2 procedure, of terminal identifier information before the link establishment, and thereafter call processing, by using a layer 3 message, is carried out, wherein the exchange is provided with a layer 3 control unit by which the exchange per se generates a pseudo layer 3 global reception call (broadcast type) and a layer 2 control unit which terminates the global reception call at the terminal equipment by the layer 2 procedure before the link establishment, extracts the terminal identifier information of the terminal equipment from a logical link establishment request frame which is sent from the terminal equipment in response to the termination, and notifies the terminal identifier information to the layer 3 control unit. The layer 3 control unit holds the terminal identifier information notified from the layer 2 control unit so as to use the same when later termination of a call to the terminal equipment occurs.

BRIEF DESCRIPTION OF THE DRAWINGS

The above object and features of the present invention will be more apparent from the following description of the preferred embodiments given with reference to the accompanying drawings, wherein:

FIG. 1 is a view for explaining a principle of the present invention;

FIGS. 3A and 3B are sequence diagrams of LAPD establishment according to a first embodiment;

FIGS. 4A and 4B are sequence diagrams of LAPD establishment according to a second embodiment;

FIGS. 5A and 5B are first parts of views for explaining the related art;

FIG. 7 is a view for explaining classification of frames of the LAPD;

FIGS. 8A and 8B are views for explaining primitives between a layer 2 and a layer 3; and FIG. 9 is a view for explaining part of a layer 3 message.

DESCRIPTION OF THE PREFERRED EMBODIMENTS

Figure 2A:
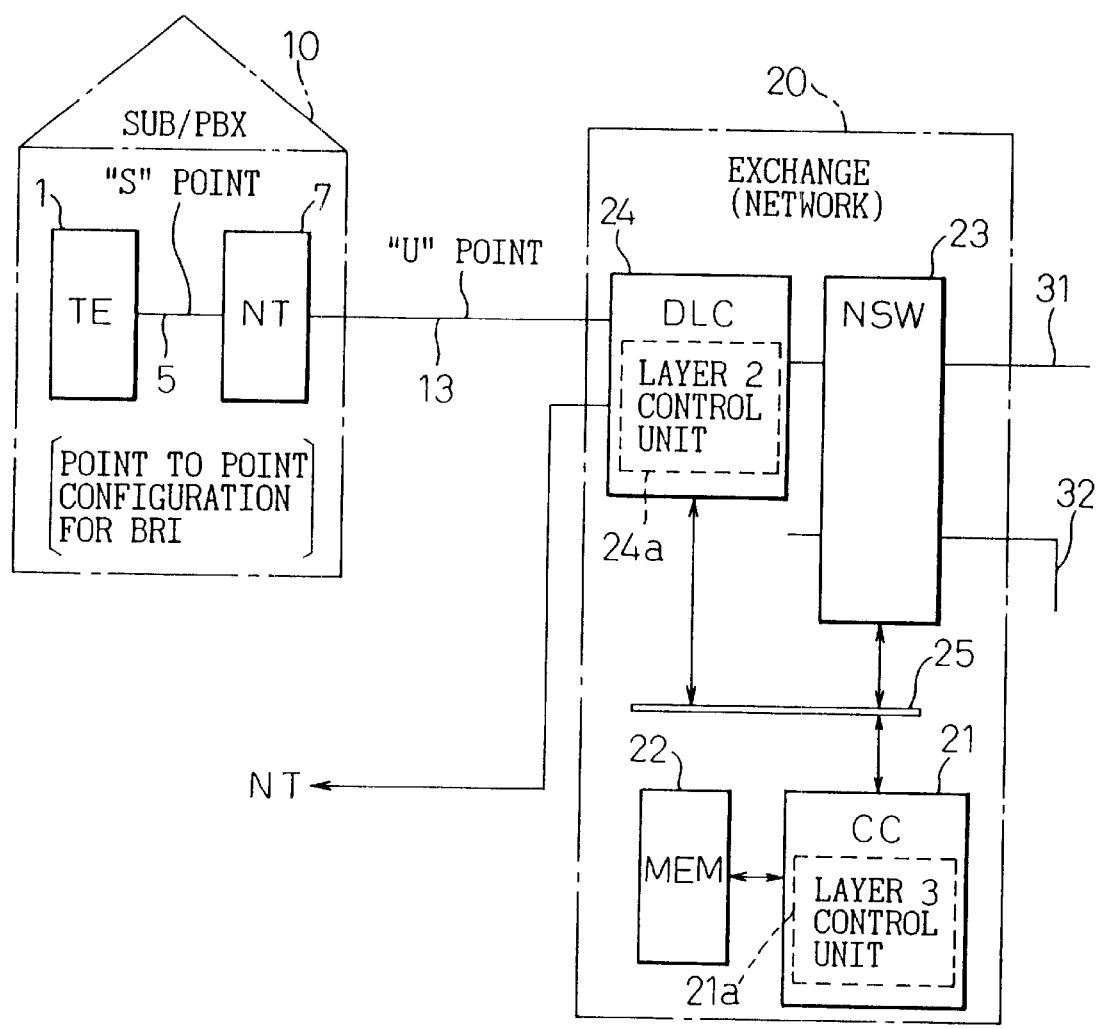
FIG. 2A is a view of the partial configuration of an ISDN network according to an embodiment of the present invention.

Before describing the embodiments of the present invention, the related art and the disadvantages therein will be described with reference to the related figures.

The user-network interfaces of the ISDN include basic rate interfaces (BRI) and primary rate interfaces (PRI). Further, as a connection configuration of subscribers (subscriber's wiring method), according to the I.430/I.431 Recommendation, in the case of the PRI, only a point to point configuration, i.e., a single point configuration, is defined, while in the case of the BRI, both a point to point configuration and a point to multi-point configuration are defined.

Further, the majority of the layer 2 protocol of the ISDN, also referred to as a "link access procedure on the D-channel" (LAPD), is applied, in common, to the BRI and PRI. The characterizing feature of this LAPD resides in the ability to set a plurality of logical links on the D-channel for every service and every terminal equipment. The logical links are identified by using an address field in the LAPD frame.

This address field contains a service access point identifier (SAPI) indicating a receiver of the service to the layer 3 and a terminal endpoint identifier (TEI) for identifying the terminal equipment (TE). Note that the SAPI can take any value of "0 to 63". SAPI=0 is used for a call control signal of the layer 3 in DSS1, SAPI=16 is used for packet data, and SAPI=63 is used for the layer 2 administration such as a TEI assignment and other.

FIG. 7 shows a classification of frames of LAPD. For example, an I-frame is used for an information transfer (C: command) in a multi-frame mode. Here, the "multi-frame mode" means a signal transfer mode for transfer of frames while confirming a delivery by using order information attached to every frame. On the other hand, a UI frame is an unnumbered information frame without an order number and is used in an unnumbered information transfer mode for sporatic transfers without confirming delivery. Note that this UI frame is used to send the layer 3 message [SETUP], before the link establishment, to each terminal equipment TE in a broadcast mode (SAPI=0, TEI=127), to achieve the assignment of a TEI value to terminal equipment TE, or to achieve the layer 2 administration such as a check of the TEI values and other.

Further, a SABME frame is a frame requesting setup of a logical link of the multi-frame mode. A UA frame (R: response) is used for acknowledgement thereof. Accordingly, the transfer of the layer 3 message by the I-frame becomes possible after the establishment of the LAPD (link).

Note that FIGS. 8A and 8B show the classification and meaning of primitives to be transferred between layer 2 and layer 3; and FIG. 9 shows part of the layer 3 message. This will be appropriately referred to in the following explanation.

There is unspoken agreement that, in the case of PRI, the TEI values in the ISDN be assigned at the PBX side alone and that usually TEI is made equal to 0. On the other hand, in the case of BRI, in order to guarantee the portability of the terminal equipment TE, a procedure is prepared for assignment of the TEI values and the TEI values are assigned when the need arises (when the terminal equipment is connected etc.)

The TEI value of a BRI subscriber can take any value of "0 to 126". Particularly, the values of "0 to 63" among them can be set in advance at the terminal equipment TE side by using, e.g., a DIP switch, ROM, etc. provided by the terminal equipment. Further, there also exist terminal equipment TE which do not set TEI values by themselves. In this case, when the terminal equipment TE is connected to a subscriber side network termination equipment (NT: Network Termination), a frame requesting assignment of a TEI {UI (SAPI=63, TEI=127)} is sent from the terminal equipment TE to the exchange (hereinafter, also referred to as the network), and an empty TEI value "64 to 126" is assigned, as the response thereto, from the network side.

When performing the call setup procedure in an ISDN (hereinafter, also referred to as the call processing), this TEI value becomes necessary first when the LAPD is to be established. According to the subscriber's reception sequence in the ISDN, due to a difference of the connection configuration of the subscriber side (point to point or point to multi-point), this LAPD establishment procedure and the method of setup of the TEI value at the establishment are also different. This will be concretely explained in more detail below.

Figure 5A:
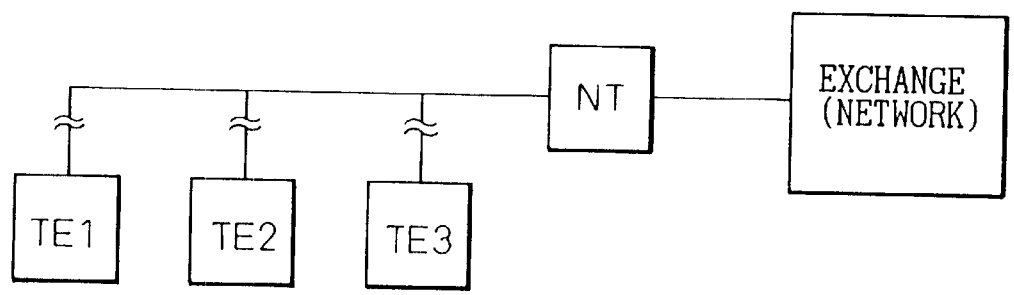

FIGS. 5A and 5B and FIGS. 6A and 6B are views for explaining the related art, and FIGS. 5A and 5B show the reception procedure of the point to multi-point configuration in a BRI.

In FIG. 5A, the subscriber's bus in a point to multi-point configuration may have connected to it a maximum of eight units of terminal equipment. In FIG. 5B, in the case of a point to multi-point configuration, it is described in the Recommendation to receive a call by a broadcast data link reception procedure.

More concretely speaking, in the case of a reception under BRI, a reception call is terminated by an unnumbered information transfer frame [UI [SETUP (SAPI=0, TEI=127: broadcast type)]} from the exchange by a broadcast. The terminal equipment TE3 receiving this frame notifies its own TEI=aa by the link setup request frame {SABME (TEI=aa)}. The exchange holds this (aa). Further, when the exchange returns an acknowledgement frame {UA (TEI=aa)} in response to this SABME frame (TEI=aa), the TEI values match, so a link is established between the exchange and the terminal equipment TE3. Further, this broadcast reception is accepted also at the terminal equipment TE1 and terminal equipment TE2, so logical links are similarly established.

In this way, in point to multi-point configuration BRI reception, since the exchange establishes a logical link by using the TEI value notified from each terminal equipment TE, even if a terminal equipment TE is changed, there will never be a lack of match of the TEI values between the terminal equipment TE and the network.

Figure 6A:
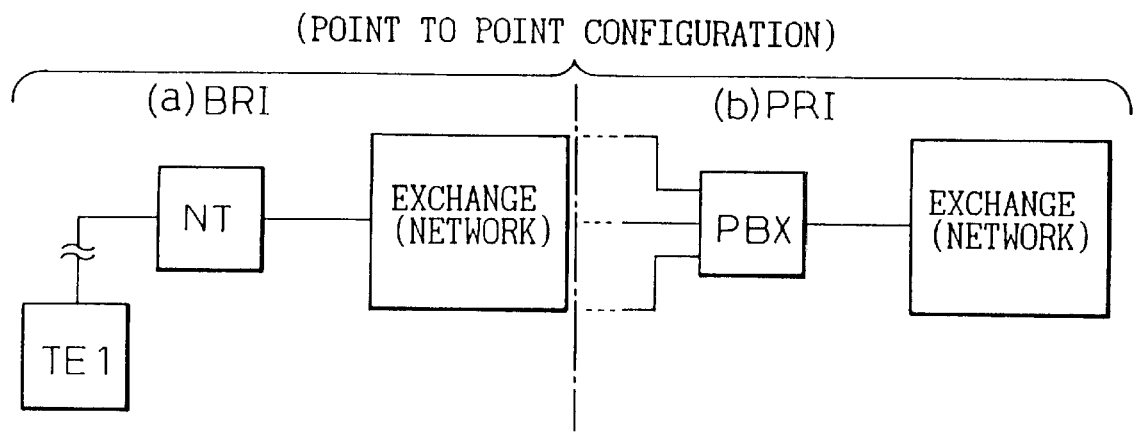
FIGS. 6A and 6B are second parts of views for explaining the related art.
Figure 6B:
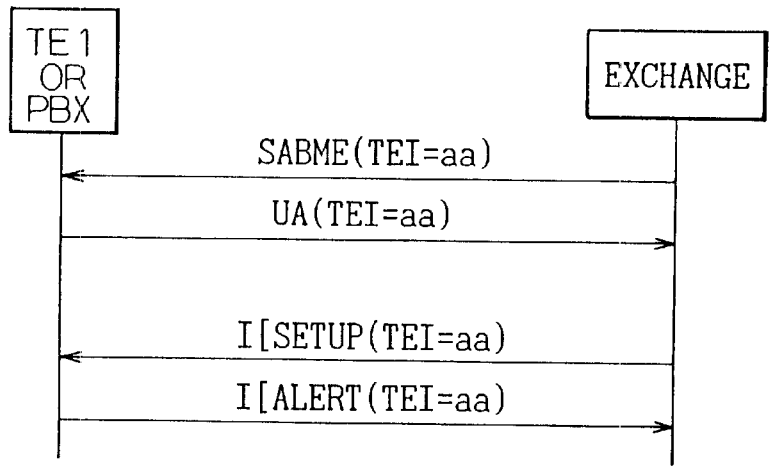

FIGS. 6A and 6B show the reception procedure for a point to point configuration. FIG. 6A-(a) shows the connection configuration of the BRI subscriber and the exchange both connected with the point to point configuration. One terminal equipment TE1 can be connected to the exchange via a network termination equipment NT. Further, FIG. 6A-(b) shows the connection configuration of the PRI subscriber and the exchange both connected with the point to point configuration. Any intra network can be connected with the exchange via a PBX.

In FIG. 6B, the reception procedure in the point to point configuration is common to both a BRI subscriber and a PRI subscriber. Namely, when the LAPD link is not yet established, it is described in the Recommendation to terminate the call by the point to point data link reception procedure mentioned below.

More concretely speaking, in the case of reception, the establishment of a link is requested from the exchange by using the SABME from (TEI=xx). At this time, as the TEI1 value to be placed in the SABME frame on the network side, in the case of the PRI, there is an unspoken agreement that TEI be set to 0 as described above. In actually, this is commonly agreed, and accordingly, even in this case, there can be no unmatch of the TEI values between the PBX and the network.

On the other hand, in the case of the BRI, the TEI value, determined by adjustment through a local procedure (for example aa), is set and sent, which TEI value is, for example, a TEI value in the subscriber data held at the network side in advance or, although not described in the Recommendation, a fixed (common) TEI value determined by negotiation with the subscriber in advance. The LAPD is established from the network side using this. In this case, if the TEI=aa held on the network side and the TEI=aa on the terminal equipment TE1 side match, a logical link is established by the response using the UA frame (TEI=aa) from the terminal equipment TE1. Thereafter, the exchange sends the information transfer frame {I [SETUP (TEI=aa)]} in which the layer 3 message [SETUP (TEI=aa)] is placed, whereby the call reception at the terminal equipment TE1 becomes possible.

Summarizing the problem to be solved by the invention, in such a point to point configuration BRI, at the time of reception, mistakes in input of subscriber data (TEI values) or mistakes in the setup of the subscriber data at the terminal equipment TE side sometimes result in the TEI value of the network side and the TEI value of the terminal equipment TE1 side not matching from the first.

Further, even if the TEI values of the two match at an initial stage, later changes in the terminal equipment TE etc. can cause the TEI value of the terminal equipment TE side to change. If this is not notified to maintenance personnel of the network side or if notified, but the TEI value of the network side is not properly changed, the values may not match.

Further, it is also possible to agree in advance to determine the TEI values of all subscribers as fixed values (for example, TEI=0) and use the fixed TEI values to establish, by the subscriber, the link access procedure on the D-channel (LAPD) call by call or at the input of the subscriber data. However, lack of thorough knowledge of the fixed TEI values or mistakes in the setup of the TEI values on the terminal equipment TE side etc. will cause the values not to match.

The present invention was made in consideration of the above problems of the related art and has as its object to provide an exchange not allowing unmatching terminal identifier information between the exchange and subscriber terminal equipment.

The above is achieved for example by the configuration shown in FIG. 1. That is, according to a first aspect of the present invention, there is provided an exchange 20 of the communications system in which terminal equipment 1 having its own terminal identifier information is connected to the exchange 20 with a point to point configuration, a logical link is established conditional on a match, by a layer 2 procedure, of terminal identifier information before the link establishment, and thereafter call processing, by using a layer 3 message, is carried out, wherein the exchange 20 is provided with a layer 3 control unit 21a by which the exchange per se generates a pseudo layer 3 global reception call and a layer 2 control unit 24a which terminates the global reception call at the terminal equipment 1 by the layer 2 procedure before the link establishment, extracts the terminal identifier information of the terminal equipment from a logical link establishment request frame which is sent from the terminal equipment 1 in response to the termination, and notifies the terminal identifier information to the layer 3 control unit 21a, the layer 3 control unit 21a holding the terminal identifier information notified from the layer 2 control unit 24a so as to use the same when later termination of a call to the terminal equipment 1 occurs.

According to the first aspect of the present invention, a global reception call (broadcast type reception call) common to all units of terminal equipment 1 (including terminal equipment changed midway) is made to pseudo terminate at the connected terminal equipment 1, the terminal identifier information is extracted from the response frame sent, as the response thereto, from the terminal equipment 1, and this terminal identifier information is held for the use at the establishment of the logical link thereafter (for example actual reception), and thus an unmatch of the terminal identifier information will not be able to occur between the exchange and the subscriber terminal equipment 1.

Preferably, according to a second aspect of the present invention, in the first aspect of the present invention, the layer 3 control unit 21a pseudo generates the global reception call of the layer 3 (i) at the startup of the system, (ii) at the input of subscriber data such as a dial number, (iii) at the recovery from a fault of the terminal equipment or lines, or (iv) when the logical link with the terminal equipment cannot be established by terminal identifier information held by the system.

Accordingly, it is possible to effectively avoid an unmatch of the terminal identifier information, in a variety of operational situations of the network, between the exchange and the connected terminal equipment 1. Further, it is possible to effectively avoid the trouble of maintenance personnel having to input the TEI values to subscriber data one by one as had been required in the past.

Further, preferably, according to a third aspect of the present invention, in the first aspect of the present invention, the layer 3 control unit 21a sends a link release request instruction to the layer 2 control unit 24a (that is, the terminal equipment 1) quickly after receiving the terminal identifier information and forcibly releases the pseudo terminated global reception call. Accordingly, it is possible to effectively inhibit the processing of the pseudo reception call from advancing further at the terminal equipment 1 side.

Further, according to a fourth aspect of the present invention, there is provided an exchange 20 of a communications system in which terminal equipment 1 having its own terminal identifier information is connected to the exchange 20 with a point to point configuration and a logical link is established conditional on a match, by the layer 2 procedure, of terminal identifier information before the link establishment and thereafter the call processing, by using the layer 3 message, is carried out, wherein the exchange is provided with a layer 2 control unit 24a which extracts the terminal identifier information of the terminal equipment 1 from a logical link establishment request frame sent from the terminal equipment 1 and notifies the extracted information to a layer 3 control unit 21a and the layer 3 control unit 21a which holds the notified terminal identifier information so as to use the same at the time of reception at the terminal equipment thereafter.

According to the fourth aspect of the present invention, the logical link establishment request, at for example a call origination request from the terminal equipment 1, is acquired, the terminal identifier information is extracted therefrom, and this terminal identifier information is held so as to use the same at the establishment of the logical link (for example actual reception) thereafter, therefore no unmatch of the terminal identifier information with the subscriber terminal equipment 1 will be able to occur.

Preferably, according to a fifth aspect of the present invention, in the first aspect or fourth aspect of the present invention, the layer 2 control unit 24a is semifixedly realized in its MPU function by an MPU (microprocessor unit) and a nonvolatile memory such as a ROM or EEPROM storing the layer 2 procedure to be executed by the MPU or by a hardware configuration for executing the layer 2 procedure, while the layer 3 control unit 21a is nonfixedly realized in its CPU function by a CPU (central processor unit) and a volatile memory such as RAM storing the layer 3 procedure to be executed by the CPU.

In recent years, however, in this type of exchange, due to the load dispersion of CPUs and the adoption of object-oriented software structures, in some cases, use is being made of configurations where (i) the layer 2 control is carried out by only the MPU and the layer 2 control unit 24a comprising a ROM or the like storing the layer 2 control program (firmware), (ii) the layer 3 processing is carried out by only the CPU and the layer 3 control unit 21a comprising a RAM or the like storing the layer 3 processing program (software), and (iii) the control from the layer 3 to the layer 2 is performed by just having the layer 3 control unit 21a send a trigger (request etc.) of the processing to the layer 2 control unit 24a.

Even in such a case, according to the fifth aspect of the present invention, the generation of the pseudo reception call and (i) the holding and reutilization of the terminal identifier information extracted from the response to the call or (ii) the holding and reutilization of the terminal identifier information extracted from the request when the link establishment request from the terminal equipment 1 is generated, can be handled by just a change of the program of the layer 3 control unit 21a, i.e., it is not necessary to change the layer 2 control unit 24a semifixedly constituted by the hardware, ROM, etc. Thus, the first and fourth aspects of the present invention can be easily realized even by existing exchanges by just a relatively simple upgrade.

Below, preferred embodiments of the present invention will be explained in detail with reference to the attached drawings. Note that the same reference numerals indicate the same or corresponding parts . throughout all the figures.

FIG. 2A is a view of the partial configuration of the ISDN network according to an embodiment of the present invention. In the figure, 10 is a home (SUB) or office (PBX) of a subscriber A having a point to point configuration contract by the BRI, 1 a terminal equipment (TE), 5 a subscriber's wiring, 7 a subscriber's network termination equipment (NT), 13 a subscriber line comprising two metallic wires, 20 an exchange (or network), 21 a main control unit (CC) for performing the main control of the exchange, 21a a layer 3 control unit which is mounted in the main control unit 21 and performs call control relating to the layer 3, 22 a memory (MEM) for storing the subscriber data such as the dial number and TEI values obtained from terminal equipment TE according to the present invention, 23 a network switch (NSW), 24 a data link control unit (DLC) capable of accommodating a plurality of subscriber lines (including network termination equipment), 24a a layer 2 control unit which is mounted in the data link control unit 24 and performs the data link control relating to the layer 2, 25 a common bus of the main control unit 21, 31 a local office line, and 32 a private line.

Figure 2B:
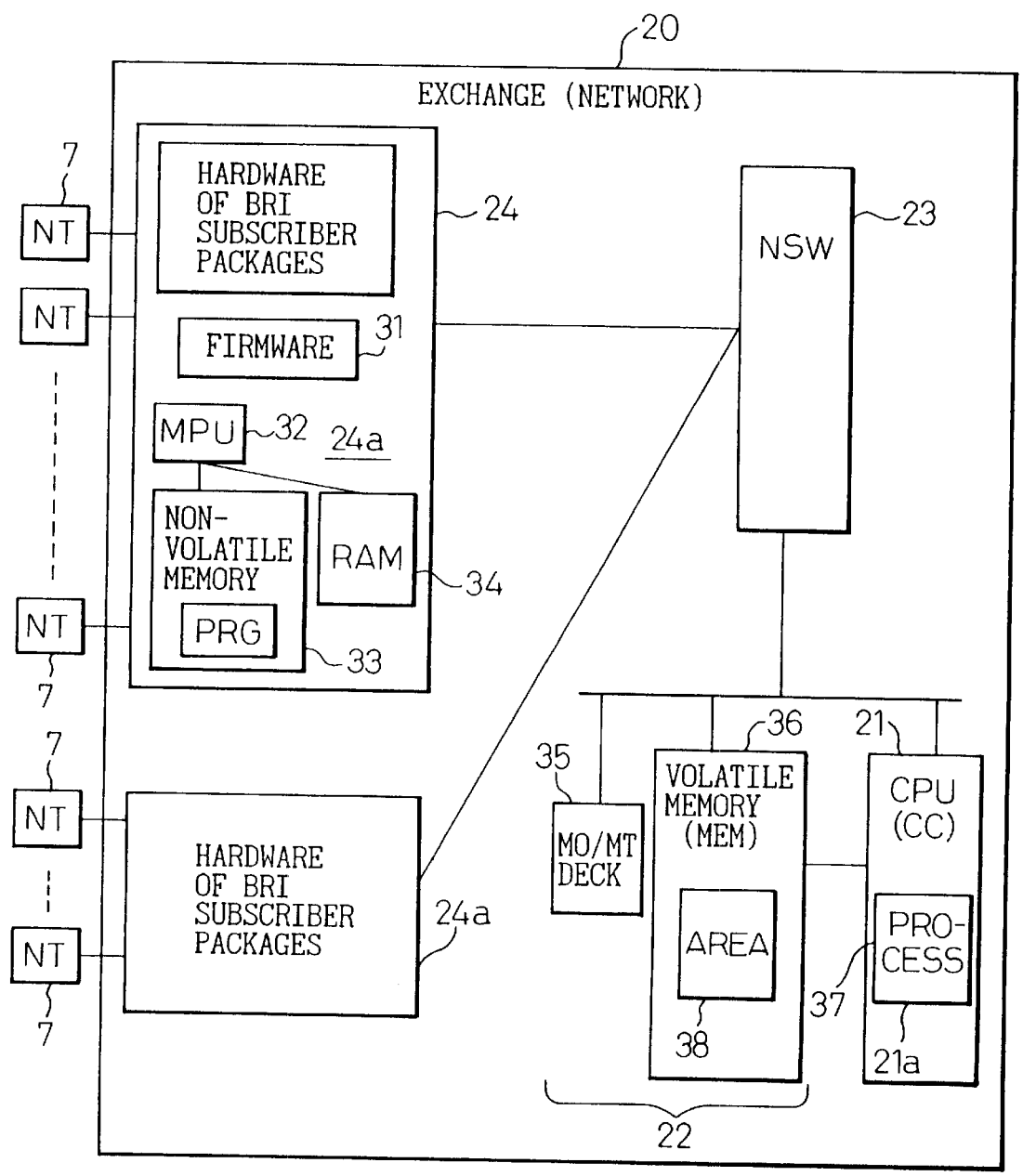
FIG. 2B is a view of a detailed example of an exchange in FIG. 2A.

FIG. 2B is a view showing a detailed example of the exchange in FIG. 2A. Constituent elements newly indicated in FIG. 2B are a firmware 31, an MPU (microprocessor unit) 32, a nonvolatile memory 33, a RAM 34, an MO/Mt deck 35, a volatile memory 36, a processing unit 37, and a memory area 38.

The MPU 32 is a processor constituting the firmware 31 for controlling BRI subscriber packages. With this MPU 32, the nonvolatile memory 33 and the RAM 34 cooperate. In the nonvolatile memory 33, a program unit (PRG) for storing various programs for performing the layer 2 control etc. is formed. This nonvolatile memory 33 comprises a ROM, EEPROM, etc.

Since a change of the ROM chip and a write operation to the ROM are necessary, a change of the program is difficult. Accordingly, the function of the layer 2 control unit 24a is semifixedly realized.

On the other hand, the CPU consisting the main control unit 21 controls the software of the exchange per se, and the processing unit 37 in the CPU reads various programs such as the layer 3 control from the volatile memory 36 to execute the processing. Note that the various programs read from the volatile memory 36 are stored in a cache memory (not illustrated).

In the volatile memory 36, a storage area of the program for storing various programs such as the layer 3 control, a storage area of processing data, and a working area are formed. This volatile memory 36 is constituted by a RAM etc.

The CPU can transfer files from the MO/MT deck 35 and update programs at any time when adding a new function to the exchange or dealing with a fault if it occurs.

In this way, the program can be easily changed, so the function of the CPU is nonfixedly realized.

Note that, an office side network termination (LT) is interposed between the data link control unit 24 and the network termination equipment 7. Further, the illustration of the constitution relating to the layer 1 control and the layer 4 or higher processing is omitted.

FIGS. 3A and 3B are sequence diagrams of the LAPD establishment according to the first embodiment and shows the sequences of the confirmation of the TEI value and the LAPD establishment triggered by a layer 3 message (issuance of the pseudo call reception) from the network side.

For example, at the initial stage or restart of the exchange 20 or by the exchange 20 recognizing the existence of the subscriber A by the input of the subscriber data (dial number etc.), the following sequence is started from the exchange 20 side.

Namely, the layer 3 control unit 21a generates a pseudo call reception message [SETUP (SAPI=0, TEI=127: broadcast mode)] by itself, places this message in the SDU (Service Data Unit) send request (DL_UDT_REQ-1) primitive for which a multi-frame link has not yet been established, and sends the same to the layer 2 control unit 24a. The layer 2 control unit 24a receiving this request primitive places the received message in the unnumbered information transfer frame {UI-1 [SETUP(TEI=127: broadcast mode)]} and sends the same to the network termination equipment 7. Further, the network termination equipment 7 receiving this UI-1 frame extracts the reception message [SETUP (TEI=127: broadcast mode)] from the UI-1 frame, places this in the SDU reception notification (DL_UDT_IND-1) primitive for which a multi-frame link has not yet been established, and sends the same to the terminal equipment TE accommodated thereby (note, only TE1 of TEI=3 exists in this case).

In this case, the terminal equipment TE1 (software therein) receiving the reception message does not recognize whether or not it itself is the BRI user in the point to point configuration, but this is recognized at the network side. Accordingly, the terminal equipment TE1 in this case, upon receiving the global (broadcast type) reception call, sends the data link establishment request {DL_EST_REQ-1 (TEI=3)} to the network termination equipment 7 as advance preparation for returning the layer 3 message [ALERT or CALL PROC etc.] by the I-frame later, as usual. The network termination equipment 7 which received this request sends the link establishment request frame {SABME-1 (TEI=3)} to the layer 2 control unit 24a. Further, the layer 2 control unit 24a receiving this frame recognizes the establishment of the LAPD (TEI=3) link and notifies this to the layer 3 control unit 21a by a multi-frame link establishment notification {DL_EST_IND-1 (TEI=3)}.

The layer 3 control unit 21a receiving this notification can acquire TEI=3 of the terminal equipment TEI, as the object of the pseudo call reception, first at this time, thereafter stores TEI=3 in a subscriber data area corresponding to the subscriber A in the memory 22 so as to be enable execution of the point to point reception procedure (BRI) of FIG. 6B by using this TEI=3.

Further, the layer 2 control unit 24a returns the UA-1 frame (TEI=3) in response to the SABME frame (TEI=3) as an acknowledgment. The network termination equipment 7 receiving this frame sends a notification of completion of multiframe link establishment {DL_EST_CNF-1 (TEI=3)} to the terminal equipment TE1.

The terminal equipment TE1 receiving this notification recognizes the establishment of LAPD. Since it cannot know that the reception is a pseudo one, it tries to return a message of notification of ring up for the called party [ALERT (TEI=3)} of the layer 3 or a message of notification of call processing [CALL PROC (TEI=3)] in response to the reception message [SETUP (TEI=127: broadcast mode)], as usual.

On the other hand, the layer 3 control unit 21a in this case knows that it generated the pseudo reception call by itself, therefore must forcibly end the reception call by some method or another. Several methods can be thought of for this.

One is a method in which, as shown in the sequences of FIGS. 3A and 3B, when receiving the message of notification of ring up for the called part [ALERT (TEI=3)] {or notification of call processing [CALL PROC (TEI=3)]}, or before this, a message of a request for call disconnection [DISC (TEI=3)] is sent from the layer 3 control unit 21a side, and after this, the lines are restored by a predetermined sequence.

Another is a method in which, as shown in the sequences of FIGS. 3A and 3B, preferably, after the storage of the TEI=3, a request for release of the multiframe link {DL_REL_REQ-2 (TEI=3)} is quickly sent from the layer 3 control unit 21a to the layer 2 control unit 24a, and the layer 2 control unit 24a receiving this request sends the multiframe link disconnection instruction {DISC-2 (TEI=3)} to the network termination equipment 7. Further, the network termination equipment 7 receiving this frame sends a multiframe link release notification {DL_REL_IND-2 (TEI=3)} to the terminal equipment TE1, and the terminal equipment TE1 receiving this notification terminates the call processing relating to the related reception (that is, makes the status of both the call processing and LAPD "IDLE").

Further, the network termination equipment 7 receiving the DISC-2 (TEI=3) frame returns the UA-3 (TEI=3) frame to the layer 2 control unit 24a as the response to the above frame, and the layer 2 control unit 24a receiving this frame sends the notification of completion of multi-frame link release {DL_REL_CNF-2 (TEI=3)} to the layer 3 control unit 21a. Then, the layer 3 control unit 21a receiving this notification recognizes the forced completion of the pseudo reception call generated by itself.

Thereafter, the exchange 20 can establish a link for every actual reception call as shown in FIG. 6B by using the stored TEI=3 for subscribers which establish the LAPD call by call. Alternatively, when the system (subscriber) opts to keep the LAPD constantly established, it is possible to establish the link (TEI=3) with the terminal equipment TE1 in advance, as shown in the sequences of FIGS. 3A and 3B.

Later, however, it may occur that the TEI values will change due to a change or removal of the terminal equipment TE1 of the subscriber or that the assignment of the TEI values will change due to removal of the network termination equipment 7 or a shut off of power. The exchange 20 can adequately cope even with such cases as follows.

Namely, returning to FIG. 2A, assume that a fault (including detachment and replacement of the terminal equipment TE1) between the terminal equipment TE1 and the network termination equipment 7 is detected, as an S point fault, by the network termination equipment 7 and that this fault is notified to the layer 2 control unit 24a. Further, assume a fault (including a fault of the network termination equipment 7, line fault, etc.) between the network termination equipment 7 and the layer 2 control unit 24a is detected, as a U point fault, by the layer 2 control unit 24a. In both cases, the layer 2 control unit 24a notifies the fault information to the layer 3 control unit 21a.

When the terminal equipment TE1 finishes being replaced and the fault of the network termination equipment 7 etc. is eliminated, the layer 2 control unit 24a detects this and notifies the fault recovery to the layer 3 control unit 21a. The layer control unit 21a receiving this notification executes the sequences of FIGS. 3A and 3B triggered by this recovery notification and thereby can always acquire the correct TEI value from the terminal equipment TE1 connected at the above situation. Accordingly, the exchange can establish a logical link with the terminal equipment TE1.

Further, a case can be considered where the terminal equipment TE1 is changed before the recognition of the fault at the layer 3 control unit 21a. In such a case, if there is an actual call reception to a subscriber which establishes the LAPD is attempted from the network side to the subscriber by using the TEI value held by the exchange 20 as shown in FIG. 6B. However, the LAPD cannot be established due to the unmatch of the TEI values.

Therefore, the layer 3 control unit 21a in this case executes the sequences of FIGS. 3A and 3B and attempts to establish the LAPD again after acquiring a new terminal equipment TE1 or new TEI value. Accordingly, in this case as well, the LAPD can be established. On the other hand, a subscriber which establishes the LAPD constantly can be similarly coped with by a periodical inspection of the LAPD or the method of detecting the disconnection of the LAPD.

In this way, according to the first embodiment, the unmatch of TEI values which may occur under various situations of the network operation can be automatically avoided without intervention by maintenance personnel, therefore, not only the load of the initial input of the subscriber data (TEI value) by the maintenance personnel, but also the load of the change of the TEI values can be greatly reduced. Accordingly, safe operation of the network becomes possible and confidence of the subscribers is increased.

FIGS. 4A and 4B are sequence diagrams of LAPD establishment according to the second embodiment and show sequences of the TEI value confirmation and LAPD establishment in a case where an LAPD establishment request is issued, before the establishment of the LAPD, from a terminal equipment TE.

When there is an LAPD establishment request (call origination etc.) from the terminal equipment TE1 before the execution of the LAPD establishment from the network, the following sequence is executed. Namely, when the subscriber A activates (off-hook) the terminal equipment TE1, the terminal equipment TE1 sends a request for data link establishment {DL_EST_REQ-1 (TEI=3)} to the network termination equipment 7 prior to the call origination processing. The network termination equipment 7 sends a link establishment request frame {SABME-1 (TEI=3)} to the layer 2 control unit 24a in response to this request. Further, the layer 2 control unit 24a sends a notification of multiframe link establishment {DL__EST_$_{IND}$_1 (TEI=3)} to the layer 3 control unit 21a in response to this frame.

The layer 3 control unit 21a receiving this notification can establish a link by the conventional method by using TEI=3 at this time. The TEI=3 is stored in the subscriber data area corresponding to the subscriber A in the memory 22 so as to be enable execution of the point to point reception procedure (BRI) of FIG. 6B using this TEI=3 thereafter.

Further, the layer 2 control unit 24a returns the UA-1 frame (TEI=3), as an acknowledgement, to the network termination equipment 7 in response to the SABME frame (TEI=3). The network termination equipment 7 receiving this frame sends a notification of completion of multi-frame link establishment {DL__EST_CNF-1 (TEI=3)} to the terminal equipment TE1.

The terminal equipment TE1 receiving this notification recognizes the establishment of the LAPD and thereafter executes the sequence according to the usual call origination processing. Namely, it places a call origination message in the data send request {DL_DT_REQ-1 [SETUP (TEI=3)]} and sends the same to the network termination equipment 7. The network termination equipment 7, in response to this, sends the information transfer frame {I-1 [SETUP (TEI=3)]} to the layer 2 control unit 24a. The layer 2 control unit 24a receiving this frame sends a data reception notification {DL_DT_IND-1 [SETUP (TEI=3)]} to the layer 3 control unit. After this, the parties start speeches by the transfer of the usual call processing messages. When one party of the conversation finally ends the call, the lines are restored.

Thereafter, the exchange 20 can establish a link for every actual reception call by using the stored TEI=3 for subscribers which establish the LAPD call by call, as shown in FIG. 6B. Alternatively, when the system (subscriber) opts to keep the LAPD constantly established, it is possible to establish the line (TEI=3) with the terminal equipment TE1 in advance, as shown in the sequences of FIGS. 4A and 4B.

Note that when the system (subscriber) opts to keep the LAPD constantly established, usually a link once established by the above sequence will not be broken. However, when the link is broken due to some fault or another, the TEI=3 stored in the exchange 20 can be effectively used.

In the above embodiments, an example of application to the ISDN was explained, but it is obvious that the present invention can be applied to other types of communication system.

Further, while several preferred embodiments of the present invention were explained above, needless to say various changes of the configuration and control of units and combinations of them can be made within the scope of the gist of the present invention.

Summarizing the effects of the invention, as mentioned above, according to the present invention, the unmatch of the terminal identifier information does not occur between the exchange and the subscriber terminal equipment having any terminal identifier information, therefore the portability of the terminal equipment can be guaranteed and a link can be reliably established even under various operational situations of the network. Further, the trouble of, for example, maintenance personnel having to input the TEI values to the subscriber data one by one or change the TEI values can be effectively avoided.

What is claimed is:

1. An exchange of a communications system in which terminal equipment having its own terminal identifier information is connected to the exchange with a point to point configuration, a logical link is established conditional on a match, by a layer 2 procedure, of terminal identifier information before the link establishment, and thereafter call processing by using a layer 3 message is carried out, provided with:

a layer 3 control unit by which the exchange per se generates a pseudo layer 3 global reception call and a layer 2 control unit which terminates the global reception call at the terminal equipment by the layer 2 procedure before the link establishment, extracts the terminal identifier information of the terminal equipment from a logical link establishment request frame sent from the terminal equipment in response to the termination, and notifies the terminal identifier information to the layer 3 control unit, the layer 3 control unit holding the terminal identifier information notified from the layer 2 control unit so as to use the same when later termination of a call to the terminal equipment occurs, whereby mismatching between respective terminal identifier information held in the exchange and terminal identifier information allotted to respective terminal equipment is avoided.

2. An exchange as set forth in claim 1, wherein said layer 3 control unit generates the pseudo layer 3 global reception call of said layer 3 at least one of a startup of the exchange, at an input of subscriber data such as a dial number, at a recovery of a fault of the terminal equipment or lines, and when a logical link with the terminal equipment cannot be established by terminal identifier information held by the system.

3. An exchange as set forth in claim 1, wherein said layer 3 control unit sends a link release request instruction to the layer 2 control unit quickly after receiving said terminal identifier information and forcibly releases said pseudo terminated global reception call.

4. An exchange of a communications system in which terminal equipment having its own terminal identifier information is connected to the exchange with a point to point configuration a logical link is established conditional on a match, by the layer 2 procedure, of terminal identifier information before the link establishment and thereafter call processing, by using a layer 3 message, is carried out, provided with:

a layer 2 control unit which extracts the terminal identifier information of the terminal equipment from a logical link establishment request frame sent from said terminal equipment and notifies the extracted information to a layer 3 control unit and a layer 3 control unit which holds the terminal identifier information notified from said level 2 control unit so as to use the same at the time of reception of said terminal equipment thereafter, whereby mismatching between respective terminal identifier information held in the exchange and terminal identifier information allotted to respective terminal equipment is avoided.

5. An exchange unit as set forth in claim 1, wherein said layer 2 control unit includes a MPU and a nonvolatile memory storing the layer 2 procedure to be executed by the MPU, and said layer 3 control unit includes a CPU and a volatile memory storing the layer 3 procedure to be executed by the CPU.

6. An exchange unit as set forth in claim 4, wherein said layer 2 control unit includes an MPU and a nonvolatile memory storing the layer 2 procedure to be executed by the MPU, and said layer 3 control unit includes a CPU and a volatile memory storing the layer 3 procedure to be executed by the CPU.

* * * * *

UNITED STATES PATENT AND TRADEMARK OFFICE
CERTIFICATE OF CORRECTION

PATENT NO.     : 6,584,112 B1
DATED          : June 24, 2003
INVENTOR(S)    : N. Takahashi It is certified that error appears in the above-identified patent and that said Letters Patent is hereby corrected as shown below:

<u>Title page,</u>
Item [22], should read -- May 24, 1999 --

Signed and Sealed this

Eleventh Day of November, 2003

JAMES E. ROGAN
*Director of the United States Patent and Trademark Office*